(12) United States Patent
Miller

(10) Patent No.: US 6,535,257 B2
(45) Date of Patent: Mar. 18, 2003

(54) LIQUID CRYSTAL CELL FOR USE IN COHERENT BEAMS

(75) Inventor: Peter J. Miller, Newburyport, MA (US)

(73) Assignee: Cambridge Research & Instrumentation Inc., Woburn, MA (US)

( * ) Notice: Subject to any disclaimer, the term of this patent is extended or adjusted under 35 U.S.C. 154(b) by 0 days.

(21) Appl. No.: 09/842,151

(22) Filed: Apr. 25, 2001

(65) Prior Publication Data

US 2001/0050738 A1 Dec. 13, 2001

Related U.S. Application Data

(60) Provisional application No. 60/199,456, filed on Apr. 25, 2000.

(51) Int. Cl.$^7$ .......................... G02F 1/1335; G02F 1/13; G02B 6/32
(52) U.S. Cl. .......................... 349/113; 349/196; 385/34
(58) Field of Search ................................. 349/196, 198, 349/113, 114; 385/34, 36

(56) References Cited

U.S. PATENT DOCUMENTS

| | | | |
|---|---|---|---|
| 4,364,639 A | 12/1982 | Sinclair et al. | 350/331 |
| 5,276,747 A | 1/1994 | Pan | 385/34 |
| 5,557,692 A | 9/1996 | Pan et al. | 385/11 |
| 2001/0050738 A1 * | 12/2001 | Miller | 349/113 |

OTHER PUBLICATIONS

PCT—International Search Report.

* cited by examiner

Primary Examiner—William L. Sikes
Assistant Examiner—Dung Nguyen
(74) Attorney, Agent, or Firm—Cohen, Pontani, Lieberman & Pavane (57) ABSTRACT

A liquid crystal cell assembly is described which eliminates high-order multiple-beam interference from reflections at the interfaces between the various elements. It can incorporate fixed retarders for compensation or production of high retardances. The invention enables standard, economical methods to be used in making the liquid crystal cell, retarder elements, optical coatings, and overall assembly. Transmissive and reflective embodiments are shown.

35 Claims, 8 Drawing Sheets

LIQUID CRYSTAL CELL FOR USE IN COHERENT BEAMS

RELATED APPLICATIONS

This application claims priority from U.S. Provisional Patent Application Ser. No. 60/199,456 which was filed on Apr. 25, 2000.

BACKGROUND OF THE INVENTION

1. Field of the Invention

The invention relates generally to optical modulators, specifically optical retarder and polarization modulator assemblies that are used in optical systems such as lasers or narrow-band quasi-monochromatic beams that exhibit a relatively long coherence length (many waves).

2. Description of the Related Art

The phenomenon of phase interference is well-known and is described in standard optical texts such as Born & Wolf, *Principles of Optics* or Hecht and Zejak, *Optics*. While these present a fuller and more accurate treatment of the topic, an exemplary situation is summarized here as follows. When light is incident upon a structure that exhibits reflection at two or more nearly-parallel surfaces, there is interference between beams which have reflected from the different surfaces involved, or which have experienced multiple reflections between the surfaces involved. If the light is quasi-monochromatic or monochromatic (such as a laser beam) and is phase-coherent over distances corresponding to the differential path lengths involved, interference will result in spatially resolved light and dark fringes corresponding to regions of constructive and destructive interference. The specific fringe pattern, arising as it does from the relative phase between the beams, varies with the wavelength of light. So the interference pattern may be seen as varying with location for light of a given wavelength, or varying with wavelength for a given location.

In some structures such as the well-known Fabry-Perot interferometer, Fizeau interferometer, and so on, the fringe pattern is desired as a means of selecting wavelength, measuring wavelength, or spectrally filtering an optical beam. However, in most imaging or modulation systems, such an interference pattern would be undesirable, and components are designed to minimize or eliminate such effects.

Known techniques for doing so include mounting the optical components at non-normal incidence, so that beams reflecting from the various surfaces can be spatially separated, which eliminates the interference; or use of highly-efficient anti-reflection coatings, so that the energy in the various reflections beams is minimized; or by incorporating lossy elements between the reflecting surfaces, so that multiple-pass reflections are damped. If the system is viewed as a resonator, the latter approach effectively reduces its Q factor.

Wedged substrates have been used to construct a liquid crystal variable retarder, to defeat interference arising from reflections at the exterior faces of the device. Similarly, devices have been built wherein the liquid crystal layer is bounded by high-reflection mirrors, to produce a liquid-crystal tunable etalon, and these have generally been constructed using wedged substrates to eliminate fringing from reflections at the outer face of the device. However, use of wedged substrates is incompatible with prevailing liquid crystal fabrication methods, which are designed to use flat, relatively thin sheet glass instead. In the normal process, one produces a large panel containing many liquid crystal cells, which are subsequently cut into individual pieces, filled, and sealed. In contrast, the use of wedged substrates forces one to assemble the cells singly, at greatly increased cost. Also, the process is considerably more labor-intensive, so the number of cells a given facility can produce is much lower than if the panelized approach is used. Further, several of the steps involved in liquid crystal cell fabrication—such as spin-coating, alignment-layer buffing, and adhesive deposition —cannot be performed as easily when wedged substrates are used, nor can comparably tight quality control be achieved. Thus, liquid crystal cells that use wedged substrates are inherently more expensive, require non-standard production equipment, have lesser quality, and are difficult to provide in volume.

It is common practice to provide a liquid crystal cells with anti-reflection coated faces, either by laminating it to polarizers or similar materials that have such a coating; or by cementing the cell to glass windows that have antireflection coatings on their outer faces. The quality of coating which can be produced on glass is superior to that produced on polarizers, but even under ideal conditions it is difficult to produce less than 0.25% reflection per surface reliably.

While this is a small amount, which one might expect would have a negligible effect on the overall assembly, this is not actually the case. The intensity of the fringes produced when two phase-coherent beams interfere is:

$$I_{fringe} = 4(I_A * I_B)^{1/2} \qquad [1]$$

where $I_A$ and $I_B$ are the intensities of the two beams. In a liquid crystal cell that operates in reflection-mode, beam $I_A$ might be the primary beam, and beam $I_B$ might be an unwanted reflection from the anti-reflection coated outer face of the device. If the intensity of the beam incident upon the cell is termed $I_0$, the two intensities are then $$I_A = 0.9975 \, I_0 \qquad [2a]$$

$$I_B = 0.0025 \, I_0 \qquad [2b]$$

where we make the approximation that the cell is otherwise lossless. Thus, the fringe intensity is $$I_{fringe} = 4(0.0024938 \, I_0^2)^{1/2} = 0.1998 \, I_0 \qquad [3]$$

or nearly 20 percent of the intensity of the primary beam. So even surfaces or interfaces that produce what one might expect to be negligible reflections, based on the reflection coefficients involved, yield quite significant interference patterns when they interfere with a bright beam. This is because, loosely speaking, such interference is proportional to the strength of the electric field of the weaker beam, while intensity is a measure of the square of the electric field. In the present example, the intensity of the beam reflected from the coated surface is $\frac{1}{400}$ as great as that of the incident beam, but the electric field is $\frac{1}{20}^{th}$ as great. When the reflected beam interferes with the main beam, it alters the electric field up or down by 5 percent, which produces an intensity change of plus or minus 10 percent, for a total peak-to-valley fringe depth of 20 percent.

Interference effects arising from reflections at the opposite faces of the liquid crystal layer itself are in some sense unavoidable, since there is always a finite reflection, and one usually wishes the liquid crystal to have a uniform thickness, to yield a retardance that is the same for all points within the aperture. Thus, one inevitably forms a parallel resonant cavity structure. However, because the liquid crystal layer is relatively thin (typically 4–25 microns) and well-controlled, the effects of this fringe pattern are often acceptable.

One reason for this is that the spectral period between successive peaks is relatively wide. This is an interference of relatively low order, where order denotes the path difference between interfering beams, counted out in wavelengths of light in the intervening medium.

Low-order interference has a wide spectral separation, while high-order interference has a narrow spectral separation. This may be quantified and calculated if one desires. When interference occurs from reflection at opposite faces of a slab of material, the spectral separation between successive peaks in the fringe pattern is given by $$\delta\lambda=\lambda^2/(2nd) \quad [4]$$

where $\lambda$ is the wavelength of light involved, n is the refractive index of the material between reflective surfaces, and d is the thickness of the slab. For a liquid crystal layer 10 microns thick with an index of 1.50, operated at 1.5 microns, the spectral separation between successive fringes is 75 nm. When such cells are used to make tunable filters, attenuators, switches, or other components which control or transmit light over a bandwidth narrower than 75 mn, the fringes do not significantly distort the bandpass of the system. In contrast, interference arising from parallel surfaces that are more widely spaced, will have a narrower spectral period, and will introduce ripple or distortion within the passband of the system. Consequently, interference between such elements is more deleterious to the system than interference across the liquid crystal layer itself.

At the other extreme, reflection between elements that are separated by a distance which exceeds the coherence length of the beam involved, does not lead to interference since the beams are not phase-coherent. One can estimate the coherence distance of a polychromatic beam by the equation $$L=\lambda^2/\delta\lambda \quad [5]$$

In this case, the bandwidth of interest $\delta\lambda$ is that of the limiting element in the system, whether that be the source, the liquid crystal assembly, or some other spectral filtering element. It is often impractical when working with relatively coherent sources (or in narrowband instruments) to construct a liquid crystal assembly using components that are so thick that all reflecting surfaces (or interfaces) are so far apart as to greatly exceed L. Even when possible, this approach results in excess bulk, weight, and cost.

It is common to combine an optical retarder with a liquid crystal cell, to effect an optical retardance that is variable by means of the electro-optic action of the cell; and which spans a range that is not readily available by use of the liquid crystal cell alone. Basically, an optical retarder is placed in series with the cell, and oriented with its slow axis either parallel to, or perpendicular to, the retarder axis of the liquid crystal cell. The retardances of the two elements are summed or differenced thereby. One common reason for using this arrangement is to compensate for the residual retardance of the cell (since some retardance remains, even at high applied voltages), and in this way to enable providing a retardance of zero. This is exhaustively described in the prior art as a way to obtain enhanced contrast or extinction ratio when such a system is placed between polarizers. Such assemblies of a cell and retarder are availably commercially from Meadowlark Optics (Longmont, Colo.).

Another situation where optical retarders are used in combination with liquid crystal cells is in the construction of tunable filters using Lyot and Solc design. In applications such as solar astronomy, telecommunications channel selection, and Raman imaging, such filters are used to produce narrow, tunable passbands. Complete filters of this type are available from Cambridge Research & Instrumentation, Inc. (Boston, Mass.).

In a retarder-compensated cell, it is impossible to match the index of the retarder to that of the other materials involved, if only because the retarder is made of birefringent material and thus has two distinct optical indices, $n_o$ and $n_c$. Even if one or the other index matches that of the other components involved, it is impossible to match both. Further, the optimum materials for retarder selection may not have indices that are well-matched to those of the other materials. Retarder choice is governed by factors such as aperture, thickness, cost, and amount of retardance needed.

Common retarder materials include calcite, lithium niobate, polyvinyl alcohol, polycarbonate, polyethylene terapthelate (Mylar), mica, and quartz. All of these mismatch the index of the standard liquid crystal cell glass such as Corning 7059 or 1737F by 0.05 or more. Among other retarder materials such as liquid crystal polymers, stressed glass, KDP (potassium dihidrogen phosphate) and its isomorphs, some have the potential to provide a better match but all suffer one or more of the following limitations: they are not readily available, are subject to hygroscopic attack, cannot be produced in large aperture, have limited retardance range, or are very costly.

As this indicates, it is not practical to eliminate reflection between a retarder and a liquid crystal cell by choice of component material.

The incorporation of a retarder into the overall assembly increases the number of reflective interfaces by at least one (and in most cases two or more), and thus increases the number of interfering beams. Consequently, all the problems recited earlier with regard to liquid crystal cells in coherent beams, apply with even greater force when constructing assemblies of liquid crystal cells with retarders.

Thus there is no device or method of construction at present which provides a liquid crystal cell, either alone or in series with a fixed retarder, that does not suffer from significant interference between two or more beams, in addition to the interference from the opposite faces of the liquid crystal layer itself.

SUMMARY OF THE INVENTION

It is an object of the present invention to provide a liquid crystal cell that can be used with essentially no optical interference other than that produced by the opposite faces of the liquid crystal layer. It is a further object to provide such an assembly in a manner that is compatible with conventional, low-cost manufacture of the liquid crystal element involved, and specifically to be compatible with the high-volume, panelized cell construction described above. This compatibility is achieved without adding significant cost anywhere else in the assembly process. Fixed retarders may be incorporated for purposes of compensation or of providing a desired range of retardance values.

It is yet another object of the invention to provide both reflective and transmissive embodiments that share the aforementioned benefits over the prior art. Finally, it is an object of this invention to attain this without restricting in any way the choice of materials that can be used as retarders, substrates, or liquid crystal materials. Thus it is possible to span the entire range of retardances, aperture, and the like which have heretofore been possible, while enjoying the novel benefit of eliminating high-order interference.

The invention consists, in the simplest embodiment, of a reflective or transmissive cell of ordinary manufacture to which a wedged glass spacer is attached on one or both faces of the cell by index-matching cement or epoxy. The spacer material and the epoxy are well-matched in optical index to the substrate glass used in the liquid crystal cell, since any mismatch at the interfaces will produce a reflected beam that will interfere with the primary beam. However, it is relatively straightforward to match the refractive index of the wedged spacer to the substrate within 0.005 over a wide spectral range, by simply using the same glass type as is employed in the substrate. For example, if Corning 1737F is used as the substrate, the spacers could be cut from sheets of the same material, then ground and polished to achieve a wedge of 0.5 degrees. Alternatively, one can use an optical glass that matches the index of Corning 1737F. Optical epoxies and gels are available which have an index in the proper range (n=1.49–1.54) and are thus an excellent match. In this way, reflections at the spacer/cell interface are kept to as little as 0.0003 percent or less.

Windows are then mounted to the wedged face of the spacer, and such a window typically will have its outer face anti-reflection coated so there is low reflection at the glass/air interface. In a reflective mode cell, there is only one set of spacers and windows; in a transmissive mode cell, two sets may be employed, one on each side of the cell.

A compensating retarder may be mounted to the wedged face of the spacer when this is required, and a window may then be mounted to the exterior face of the retarder, if desired. Or, the exterior face of the retarder may itself have an anti-reflection coating so it functions as the window. Or, the overall assembly may be joined with other optical elements using index-matching adhesives, eliminating the need for anti-reflection coatings on outermost faces. A retarder is normally planar, in order to produce uniform retardance across its aperture. Thus, reflections at the interface between the retarder and spacer, and retarder and window (if present), are canted at an angle to the plane of the liquid crystal material. This angle is chosen so that the divergence between the main beam and the unwanted reflections is great enough that they are spatially separated before encountering the detector, film, or measurement apparatus to which the light beam involved is ultimately presented.

The result is that interference is defeated, just as when one constructs the liquid crystal cell using wedged substrates. However, the construction is enormously simplified with the present invention, since the cell can be fabricated using high-quality, low cost methods including panelized assembly. The only additional cost of the present invention compared to a prior-art fringing assembly, is that of the wedged spacer element, which is readily made and attached using conventional optical device manufacturing methods, with special attention to matching the optical indices of the adhesive, spacer, and cell substrates.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The following figures depict side views of the optical assemblies being discussed. They are illustrative in nature and are not to scale, particularly in the regard that thin elements such as adhesive lines are shown with increased size for clarity.

DETAILED DESCRIPTION OF THE PRESENTLY PREFERRED EMBODIMENTS

Successful practice of the invention requires suitable design and choice of materials. First, the wedge angle used for the spacer element must be appropriate for the overall system in which the inventive assembly will be used. While an angle of approximately ½ degree is used in the embodiments shown here, it should be understood that any angle may be used provided that it is sufficient to separate the beams that reflect from the liquid crystal layer (and other interfaces parallel to it), from beams that reflect from the wedged face (and other interfaces parallel to it). However, use of a wedge angle that is larger than needed can have deleterious effects, since the presence of a wedged element leads to chromatic dispersion, or prism action. Typically, the wedge angle will be in the range from ¼ degree to 8 degrees.

The beam propagation angles are well-known to those skilled in optics design, and in addition may be calculated using ray-tracing programs and the like.

In the case of reflection-mode liquid crystal cells, one's primary concern is interference between any reflected beam and the main beam, since this can result in interference fringes that are orders of magnitude stronger than the reflected beam itself. The invention achieves the complete elimination of such interferences, provided that the interface between the substrate and the wedged spacer is well-matched in index.

In the case of transmission-mode liquid crystal cells, the primary concern is to eliminate or greatly reduce interference between reflections arising at the liquid crystal layer, and at other interfaces. This is because the greatest degree of reflection is typically experienced at the interface between the liquid crystal and the electrode, which is typically indium-tin oxide (ITO). The invention ensures the essential elimination of interference that may arise from reflections from the liquid crystal layer and other interfaces parallel to it, provided that the interface between the substrate and the wedged spacer is well-matched in index.

Figure 6:
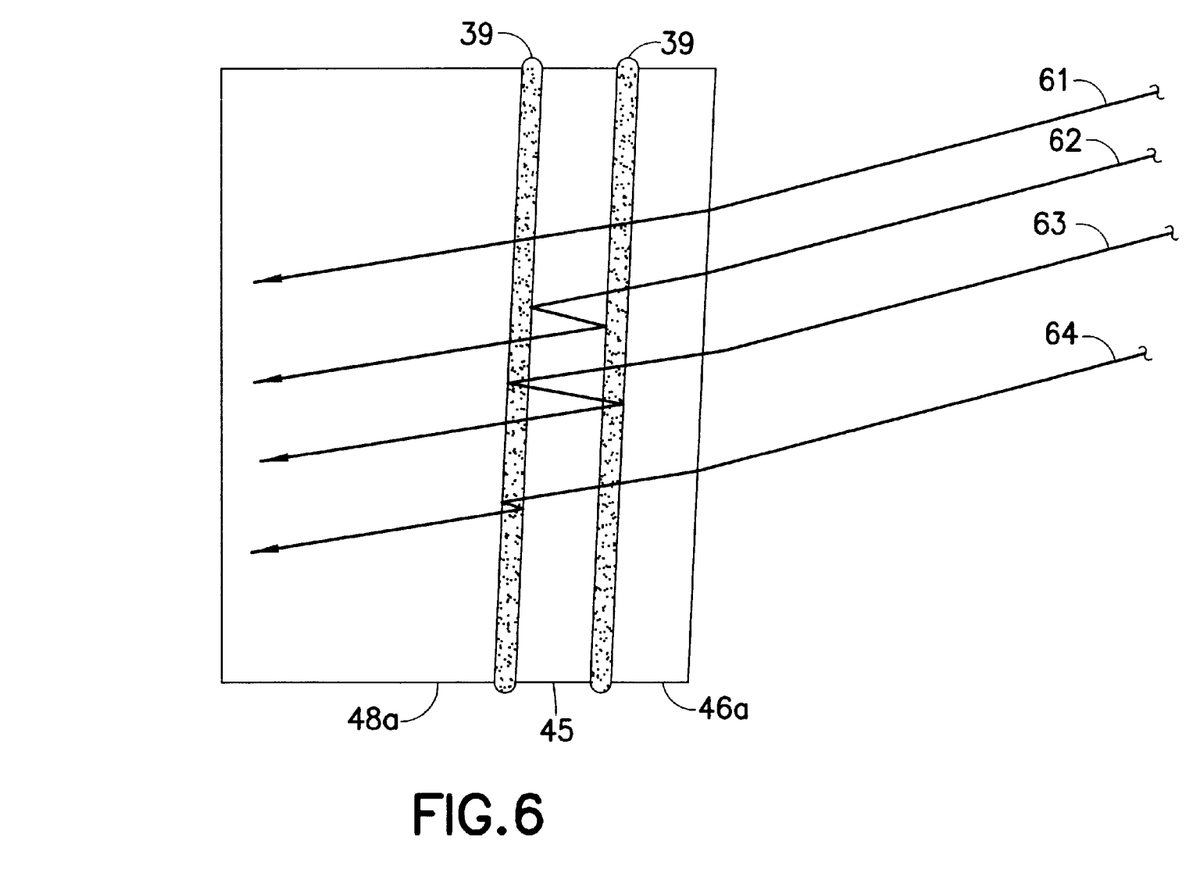
FIG. 6 shows a detail of the present invention, consisting of a retarder 45, adhesive 39', the wedged spacer 48a, and window 46a. Ray 61 passes directly through all these members without reflection, while ray 62 is reflected at the interface between retarder 45 and adhesive 39 adjacent the wedged spacer 48a, and reflected again at the interface between retarder 45 and adhesive 39' adjacent window 46a. Ray 63 is reflected at the interface between adhesive 39 and wedged spacer 48a, and reflected again at the interface between adhesive 39' and window 46a. Ray 64 is reflected at the interface between adhesive 39 and wedged spacer 48a, and reflected again at the interface between adhesive 39 and retarder 45.

Other interferences are still possible, arising from doubly-reflected rays such as those diagrammed in FIG. 6 as 62, 63, 64, and similar rays. When they interfere with the main beam, these cause interference fringes that are typically at least two orders of magnitude weaker than the main beam. The intensity associated with doubly reflected beams is:

$$I_{doubly\ reflected} = I_0 R_1 R_2 \quad [6]$$

where $R_1$ and $R_2$ indicate the reflection coefficients at the two reflecting interfaces. When they interfere with the main beam having intensity of order $I_0$, the fringe depth is:

$$I_{fringe} = 4(I_0 * I_{doubly\ reflected})^{1/2} = 4\ I_0 (R_1 R_2)^{1/2} \quad [7]$$

i.e. four times the geometric mean of the two reflection coefficients. So, in order to achieve a fringe depth of 1 percent in the main beam, $R_1$ and $R_2$ (if equal) must be kept to ¼ percent. This is normally quite easy to achieve, since the reflection coefficient at an interface between materials A and B with indices $n_a$ and $n_b$ is given by:

$$R = [(n_b - n_a)/(n_b + n_a)]^{1/2} \quad [8]$$

Suppose material A is a glass of the type widely used in liquid crystal construction, such as Corning 7059, Corning 1737F, Pilkington Select float glass, Glaberval Flachglass, and others. Corning 1737 has an index of approximately 1.516 at the He—Ne laser wavelength of 633 nm. It is then possible to use any material B having an optical index in the range from $n_b = 1.375$ to $n_b = 1.675$, and meet the condition R<0.25%. Thus, it is possible to use materials such as polyvinyl alcohol, quartz, polycarbonate, polyethylene terapthelate (Mylar), liquid crystal polymer, KDP and its isomorphs, and no special attention is needed to achieve reflection of 0.25%, or fringing of 1 percent in the main beam. Calcite produces very nearly ¼ percent for the $n_o$ component, and considerably less for the $n_c$ component. Alternatively, one may apply anti-reflection coatings to the retarder to couple it to the index of the substrate and adhesives, typically in the range n=1.48 to n=1.55. This type of anti-reflection coating is normally required when working with high-index materials such as lithium niobate, and can be applied by Karl Lambrecht (Chicago, Ill.) and other optical coating firms. When using such an antireflection coating on calcite, sodium nitrate, or other high-birefringence materials, one normally seeks to match the mean index $(n_o + n_c)/2$ of the retarder, with the index of the substrate and adhesive.

When a low-value retarder is required (retardance of 2 microns or less), sheet retarder such as NRF or NRZ film from Nitto Denko America (Fremont, Calif.), or polyvinyl alcohol retarder material from Polatechno (Tokyo, Japan) may be used. These typically come with a pressure-sensitive adhesive (PSA) layer of relatively low refractive index (n=1.46). This, combined with the relatively high index of the film material and/or the encapsulant materials (n=1.54 through n=1.59), leads to relatively high index mismatch at the interfaces involved. A single reflection at this interface can reach 0.18% or more, which would produce fringe depth (peak-to-valley) of 17% when it interferes with the main beam in a reflective cell of the prior art. This underscores the importance of eliminating these interferences, as the present invention does. The interference produced by the present invention is limited to that arising from multiple reflections at such interfaces (such as ray 62 or 63), which is approximately 0.72 percent.

Note that rays such as 62 and 63 shown in FIG. 6 traverse the fixed retarder three times rather than the intended one time. Thus, they will emerge with a different polarization state from rays which were not multiply reflected. The need for an overall contrast or polarization purity in the system may place a tighter restriction on the intensity of such beams, since they are in the wrong polarization state. This can be addressed by paying special attention to the materials choice, or by use of coatings as just described. Alternatively, if the retarder is a ½ wave plate (or nearly so), the effect of two additional passes through the retarder is a one-wave plate, which is to say, no effect at all. Thus, it is preferable to use retarders that are ½ wave plates, or M+½ wave plates, if this is consistent with the overall retardance requirements and the wavelength range involved.

Turning to the materials involved, the substrates may be soda-lime, borosilicate, fused silica, or other types as may be preferred for liquid crystal cell fabrication, including without limitation all the types mentioned throughout this disclosure. Similarly, the wedged spacer may be any material that provides adequate index match to the substrate glass. Suitable choices include the material used for the substrate itself, as well as other optical glasses. There are literally scores of glasses from which one may choose for optimum index match. Examples from Schott (Duryea, Pa.) include the following:

| | |
|---|---|
| FK 51 | n = 1.4866 |
| FK 5 | n = 1.4875 |
| BK 10 | n = 1.4978 |
| BK 3 | n = 1.4983 |
| K 11 | n = 1.5001 |
| K 10 | n = 1.5014 |
| BK 7 | n = 1.5168 |
| BK 8 | n = 1.5201 |
| PK 3 | n = 1.5254 |
| BK 6 | n = 1.5311 |
| BaK 2 | n = 1.5399 |
| BaLF 5 | n = 1.5474 |
| BaLF 8 | n = 1.5536 |
| BaK 5 | n = 1.5567 |
| SK 11 | n = 1.5638 |

Further selections are available from Corning, Hoya, and the other glass manufacturers serving the optical industry. Choice of material may be based on the usual concerns of price, availability, mechanical and thermal properties such as coefficients of expansion, ease of fabrication, and the like.

For the epoxies involved, sources include Epoxy Technology (Billerica, Mass.), Norland Products (New Brunswick, N.J.), and Summers Optical (Fort Washington, Pa.). Samples of material with suitable index for matching to Corning 7059 include the following:

| Manufacturer | Type | Refractive Index |
|---|---|---|
| Ablebond | 4039 | n = 1.457 |
| Summers Optical | SK-9 | n = 1.49 |
| Epoxy Technology | 314 | n = 1.4939 |
| Summers Optical | VTC-2 | n = 1.50 |
| Dymax | OP-21 | n = 1.505 |
| Norland Products | NOA-76 | n = 1.51 |
| Norland Products | NOA-88 | n = 1.51 |
| Epoxy Technology | 301-2FL | n = 1.513 |
| MasterBond | UV-15 | n = 1.516 |
| Summers Optical | P-92 | n = 1.52 |
| MasterBond | UV11-3 | n = 1.527 |
| MasterBond | EP30-4 | n = 1.53 |
| Epoxy Technology | 301 | n = 1.538 |
| MasterBond | EP15-7DC | n = 1.546 |
| MasterBond | EP21-LV | n = 1.55 |
| Epoxy Technology | 302-3M | n = 1.556 |
| MasterBond | EP30 | n = 1.56 |
| Epoxy Technology | 301-2 | n = 1.566 |
| Ablebond | A4035 | n = 1.572 |

All of these are optical epoxies with high transparency that bond well to glass.

In one preferred embodiment, the cell is constructed of Corning 1737 glass having a thickness of 0.7 mm and a refractive index of 1.518. The liquid crystal material is type MLC-6080 (EM Industries, Hawthorne, N.Y.) in a 10 micron layer. One substrate has its electrodes formed of gold to achieve a high reflectivity of approximately 98%. The transparent spacer is attached to the non-reflective substrate of the liquid crystal cell. It is made of BK-7 material with a wedge angle of 30' of arc, or ½ degree, and has a central thickness of 1 mm. The spacer is joined to the liquid crystal cell with MasterBond UV-15. Joined to the top of the retarder by means of Summers Optical adhesive SK-9 is a window of fused silica to which a broad-band antireflection coating was applied by Karl Lambrecht (Chicago, Ill.). The refractive index mismatch between the cell substrate and the epoxy, or between the transparent spacer and the epoxy, is approximately 0.002. The epoxy was chosen in part because its refractive index (n=1.49) is intermediate between that of the transparent spacer (n=1.5168) and the fused silica window (n=1.458).

Figure 3:
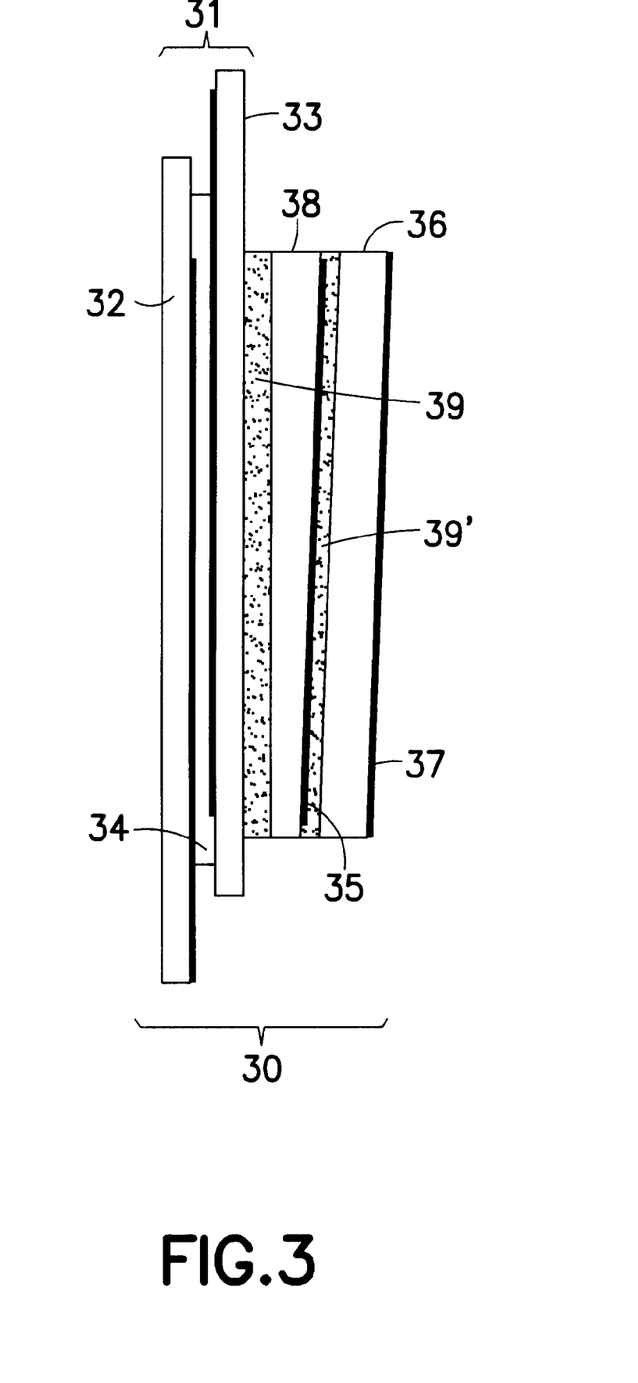
FIG. 3 shows an inventive device 30 consisting of a reflective liquid crystal cell 31 made of planar substrates 32 and 33 containing liquid crystal layer 34, wedged spacer 38, retarder 35, window 36 with antireflection coating 37. Adhesive material 39 is used between substrate 33 and spacer 38, and adhesive material 39' is used at the interfaces between the other components.
Figure 4:
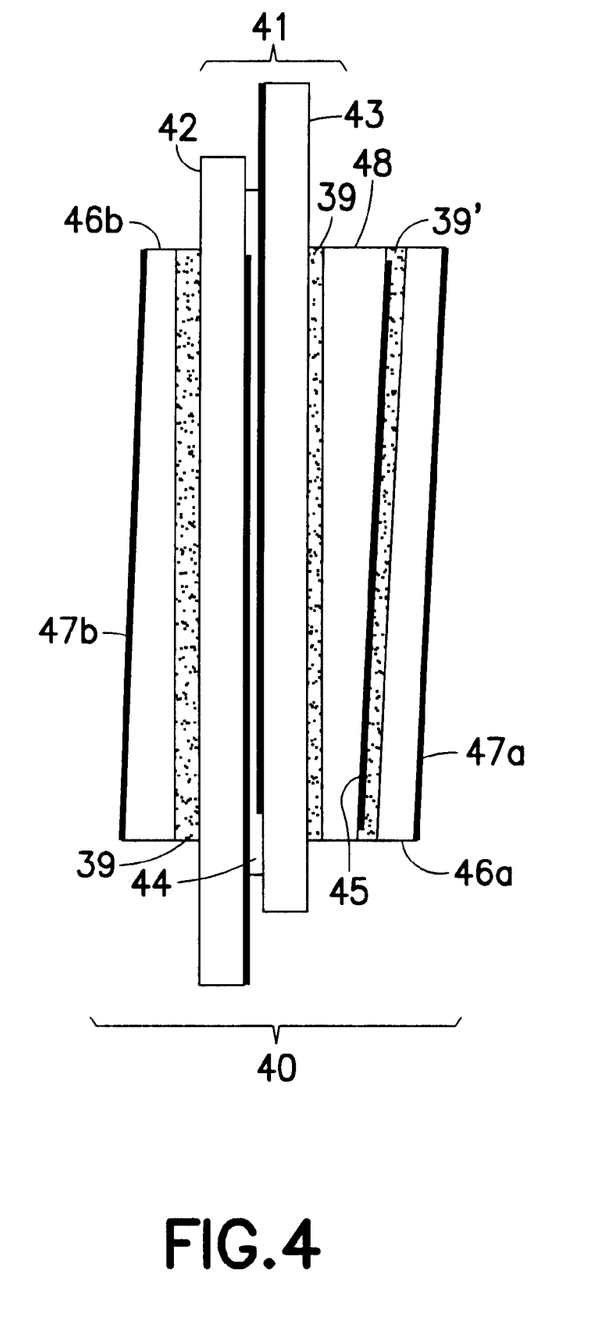
FIG. 4 shows an inventive device 40 consisting of a transmissive liquid crystal cell 41, made of planar substrates 42 and 43 containing liquid crystal layer 44, wedged spacer 48, retarder 45, windows 46a and 46b with antireflection coating 47a and 47b on their exterior faces. Window 46b is preferably wedged. Adhesive material 39 is used between substrate 43 and spacer 48, and between substrate 42 and window 46b. Adhesive material 39' is used at the interfaces between the other components.
Figure 5:
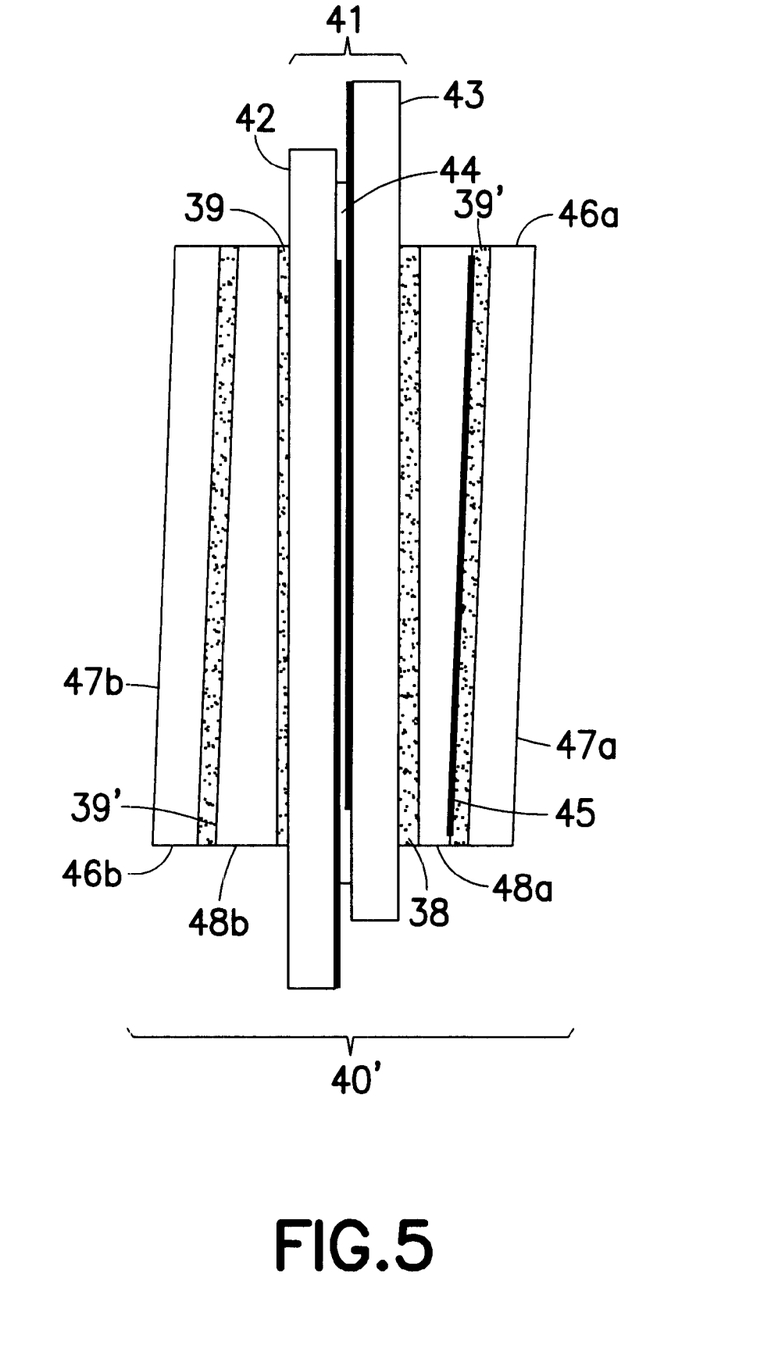
FIG. 5 shows an inventive device 40' consisting of a transmissive liquid crystal cell 41, made of planar substrates 42 and 43 containing liquid crystal layer 44, wedged spacers 48a and 48b, retarder 45, planar windows 46a and 46b' with antireflection coating 47a and 47b on their exterior faces. Adhesive material 39 is used between substrate 42 and spacer 48b, and between substrate 43 and spacer 48a. Adhesive material 39' is used at the interfaces between the other optical components.

In another embodiment, similar in construction to FIG. 3, a sheet retarder of PVA material from Polatechno (Tokyo Japan) with retardance of 140 nm, is laminated to the wedged face of the spacer, oriented with its slow axis opposed to that of the cell, between the spacer and the fused silica window.

In another preferred embodiment, also similar in construction to FIG. 3, a quartz retarder from VLOC Optics (Port Richey, Fla.) with a retardance of 1.25 waves at 1550 nm, is laminated to the wedged face of the spacer, oriented with its slow axis opposed to that of the cell, between the spacer and the window. The window is made of BK 6 material rather than fused silica.

Another preferred embodiment differs from the first embodiment only in that the cell substrates are Corning 7059F material, the transparent spacer is made of BK 6 glass, and the two are joined with MasterBond EP30-4 adhesive. The refractive index mismatch between the cell substrate and the epoxy is approximately 0.004, and between the epoxy and the transparent spacer it is less than 0.002.

It is expressly intended that various substrate materials, liquid crystal materials, liquid crystal thicknesses, wedged spacer thicknesses and angles, and reflector types may be substituted according to the requirement at hand.

Figure 7A:
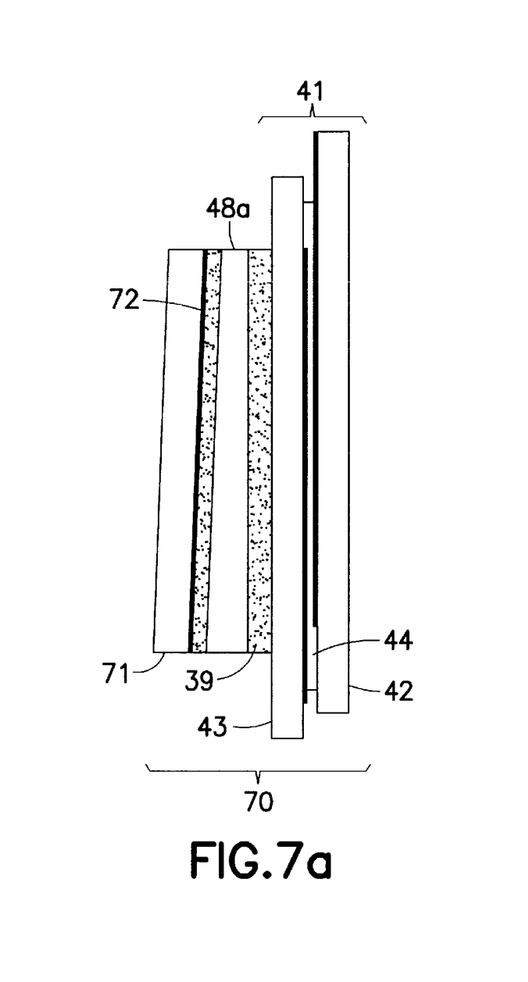
FIG. 7a shows a reflective cell 70 according to the present invention, consisting of a transmissive liquid crystal cell 41, made of planar substrates 42 and 43 containing liquid crystal layer 44, wedged spacer 48a, and first surface mirror 71 with reflective surface 72.
Figure 7B:
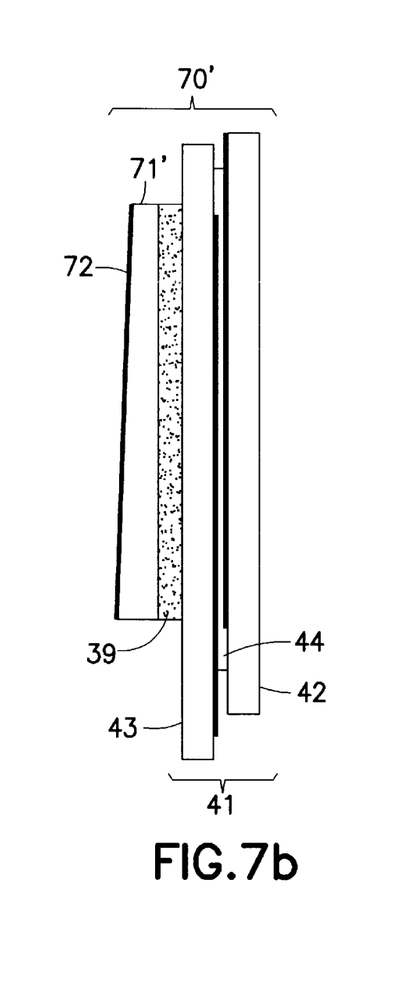
FIG. 7b shows a reflective cell 70' according to the present invention, consisting of a transmissive liquid crystal cell 41, made of planar substrates 42 and 43 containing liquid crystal layer 44, and wedged mirror 71' with reflective rear surface 72'.

In another embodiment, the reflective liquid crystal cell is constructed of a transmissive cell with an external reflector attached to its rear face, as in FIGS. 7a and 7b. The external reflector may be a mirror consisting of a glass element with a reflective coating such as gold, silver, aluminum, or a dielectric coating. In the embodiment of FIG. 7a, the mirror is a so-called 'first surface' mirror, and the reflective face is nearest the cell. However, joining such a mirror directly to the cell is not favored. Such an arrangement would be vulnerable to interference between the main beam and reflections arising at the liquid crystal layer, which is parallel to the mirror. Rather, a wedged spacer member is joined to the cell, and the mirror is attached to it. Thus, interference between the main beam and reflections from the liquid crystal slab (and those interfaces parallel to it) is thwarted.

In another preferred embodiment, the mirror is a 'back surface' mirror and the reflective face is the face opposite the cell. In this embodiment, the mirror substrate is preferably wedged, and so acts as a wedged spacer element and mirror, all in one. This skews the main reflection relative to reflections arising at either face of the liquid crystal cell, and again defeats interference effects. This is the arrangement depicted in FIG. 7b.

Figure 1:
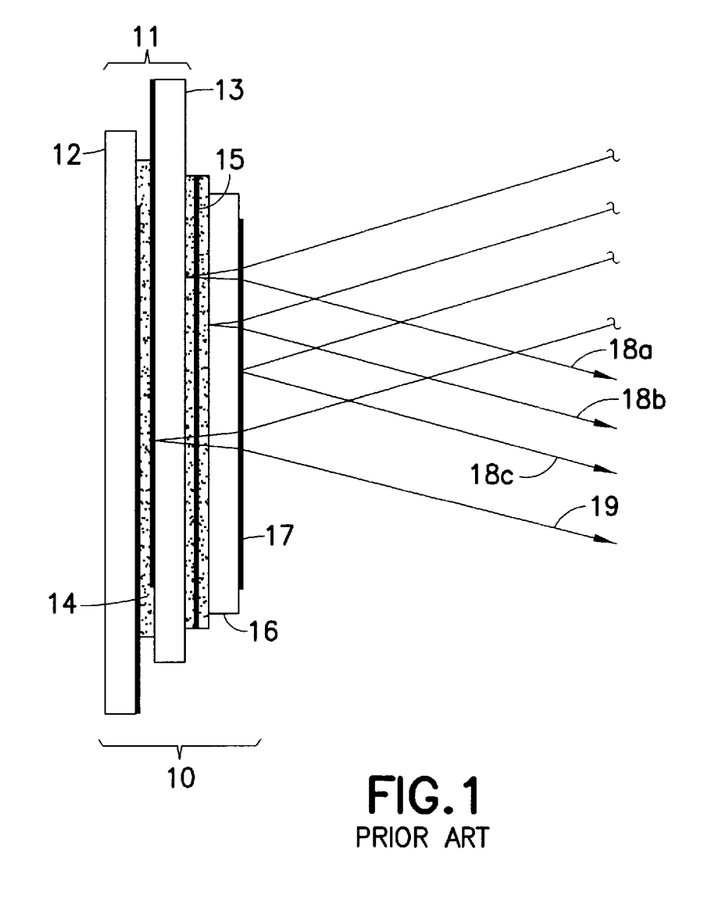
FIG. 1 shows a prior-art device 10 consisting of a reflective liquid crystal cell 11 made of planar substrates 12 and 13 containing liquid crystal layer 14, retarder 15, and window 16 with antireflection coating 17. It suffers from high-order interference at the interfaces between components 13 and 15, 15 and 16, and between coating 17 and the surrounding medium. These are illustrated as rays 18a, 18b, 18c, and the main ray 19.
Figure 2:
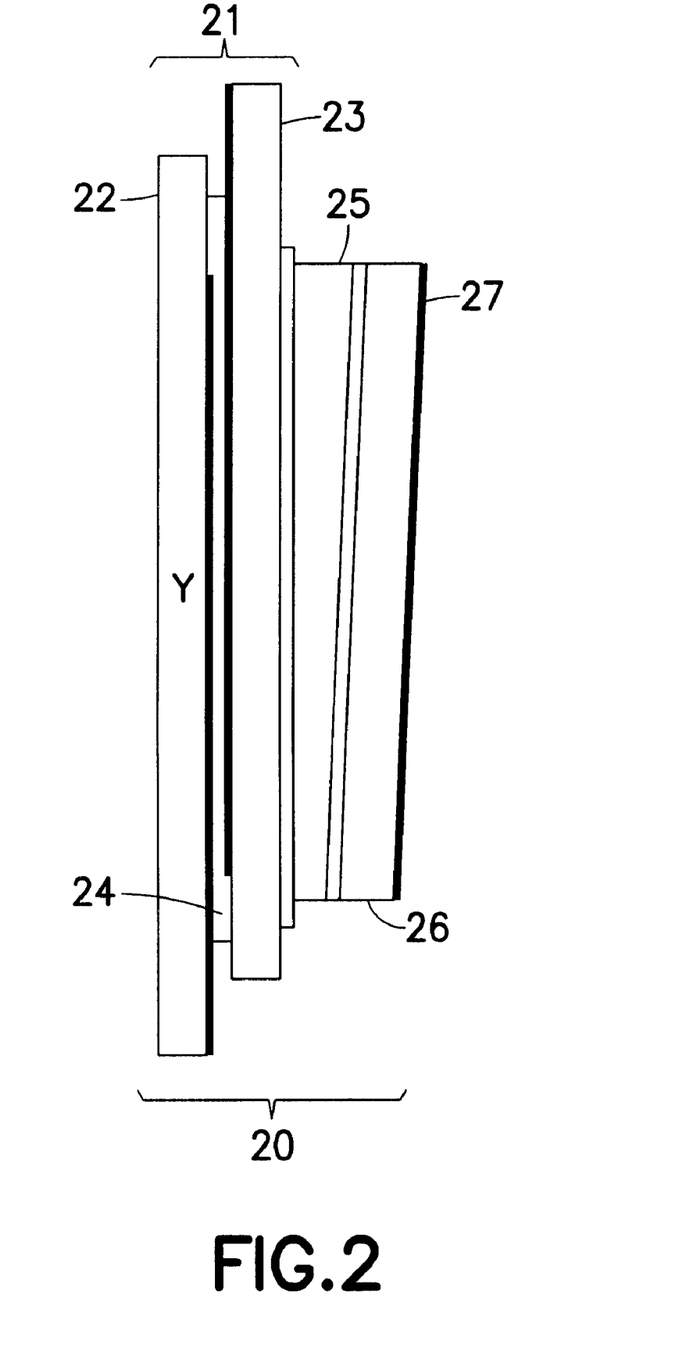
FIG. 2 shows a reflective device 20 according to the present invention, consisting of a reflective liquid crystal cell 21 made of planar substrates 22 and 23 containing liquid crystal layer 24, joined to transparent spacer 25 and window 26 having an antireflection coating 27.
Figure 8:
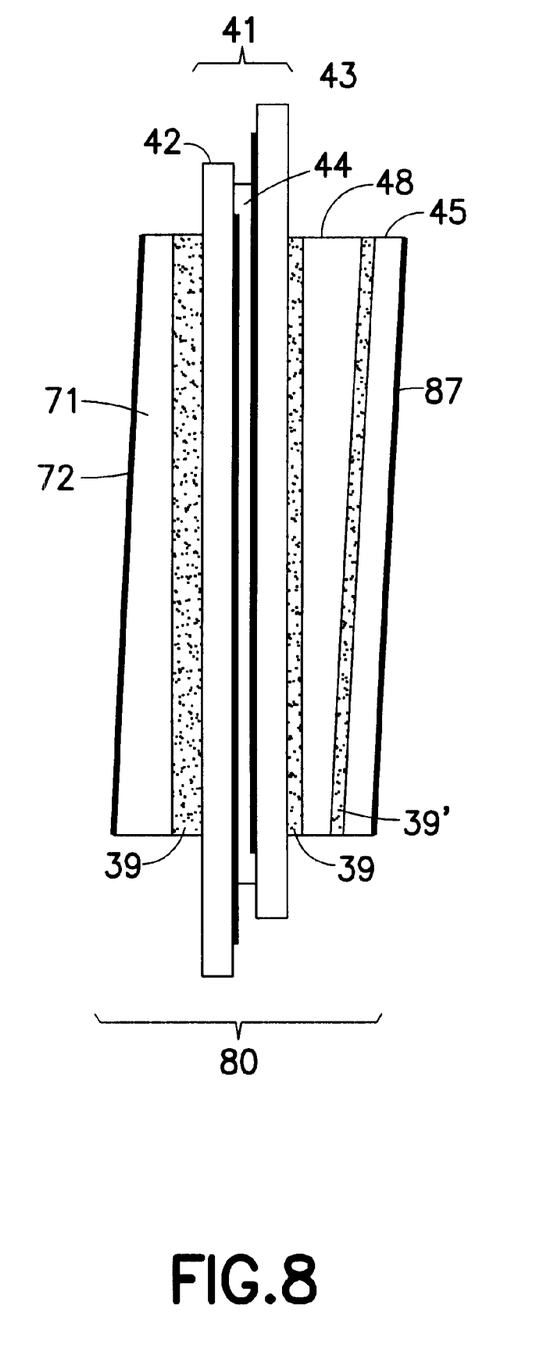
FIG. 8 shows a reflective cell 80 according to the present invention, consisting of a transmissive liquid crystal cell 41, made of planar substrates 42 and 43 containing liquid crystal layer 44, wedged spacer 48, retarder 45 with antireflection coating 87, and wedged mirror 71 with reflective surface 72. Adhesive material 39 joins the substrates 42 and 43 to spacer 48 and mirror 71, and material 39' joins spacer 48 to retarder 45.

As these figures show, the wedged spacer may be omitted on the entrance face of the cell when the mirror is wedged. It can be seen that either the entrance face needs a wedged spacer (as in FIG. 2), or the mirror face (as in FIGS. 7a and 7b), but it is not necessary to put wedged spacers on both faces unless one wishes to address effects such as dispersion that arise from use of a single wedged element; or, if one wishes to incorporate a retarder and to prevent multiple-reflections between it and the liquid crystal layer. In that case, one may elect to use wedged spacers on both faces of the liquid crystal cell, or equivalently, one may use a wedged spacer on one face and a wedged mirror on the other face, as in FIG. 8. That embodiment incorporates a retarder, adjacent the wedged spacer element on the opposite side from the cell.

Thus while certain specific embodiments have been shown in connection with this invention, it is intended that the ideas and structures revealed herein may be used in concert with one another and with elements in the existing art of optical design. It is specifically intended that one may elect to use materials, thicknesses, angles, and design values that vary from those presented herein, according to the requirements of a given application, without deviating from the spirit of the invention. Accordingly, it is the intent to be limited only by the scope of the claims appended hereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A liquid crystal cell assembly for reducing interference in coherent light beams transmitted therethrough, comprising:
    a reflective liquid crystal cell comprised of:
        a substantially transparent flat, planar substrate having electrode materials on its inner surface,
        a substantially reflective flat, planar substrate having electrode materials on its inner surface, wherein each of said reflective substrate and said transparent substrate has a substantially uniform thickness,
        a joining adhesive for joining the two substrates to achieve a precisely controlled and parallel spacing between the two substrates, wherein the inner surfaces of the two substrates are facing each other, and
        a cavity formed by the joining of the two substrates, defined by the inner surfaces, and filled with liquid crystal material;
    a wedged spacer comprised of a substantially transparent optical material having substantially the same refractive index as the transparent substrate, said wedged spacer having a first planar face and a second planar face non-parallel to the first planar face; and
    a substantially transparent optical adhesive joining the transparent substrate of the liquid crystal cell to the second planar face of the wedged spacer.

2. The liquid crystal cell assembly of claim 1, wherein the refractive index of the optical adhesive matches that of the transparent substrate, and that of the wedged spacer, within 0.01.

3. The liquid crystal cell assembly of claim 1, wherein the refractive index of the optical adhesive matches that of the transparent substrate, and that of the wedged spacer, within 0.005.

4. The liquid crystal cell assembly of claim 1, wherein the second planar face of the wedged spacer forms a wedge angle with a plane parallel to the first planar face of the wedged spacer, said wedge angle being sufficient to separate a beam that reflects from an interface of the transparent substrate and the second planar face as well as planar interfaces parallel to said interface from a beam that reflects from the first planar face as well as planar interfaces parallel to the first planar face.

5. The liquid crystal cell assembly of claim 1, wherein the second planar face of the wedged spacer forms an angle between about ¼ and about 8 degrees with a plane parallel to the first planar face of the wedged spacer.

6. The liquid crystal cell assembly of claim 1, wherein the second planar face of the wedged spacer forms an angle of about ½ degrees with a plane parallel to the first planar face of the wedged spacer.

7. A retarder-compensated liquid crystal cell assembly for reducing interference in coherent light beams transmitted therethrough, comprising:
    a reflective liquid crystal cell comprised of:
        a substantially transparent flat, planar substrate having electrode materials on its inner surface,
        a substantially reflective flat, planar substrate having electrode materials on its inner surface, wherein each of said reflective substrate and said transparent substrate has a substantially uniform thickness,
        a joining adhesive for joining the two substrates to achieve a precisely controlled and parallel spacing between the two substrates, wherein the inner surfaces of the two substrates are facing each other, and
        a cavity formed by the joining of the two substrates, defined by the inner surfaces, and filled with liquid crystal material;
    a wedged spacer comprised of a substantially transparent optical material having substantially the same refractive index as the transparent substrate, said wedged spacer having a first planar face and a second planar face nonparallel to the first planar face;
    a substantially transparent spacer optical adhesive joining the transparent substrate of the liquid crystal cell to the second planar face of the wedged spacer; and
    an optical retarder having a substantially transparent retarder optical adhesive joining it to the first planar face of the wedged spacer.

8. The liquid crystal cell assembly of claim 7, wherein the refractive index of the spacer optical adhesive matches that of the transparent substrate, and that of the wedged spacer, within 0.01.

9. The liquid crystal cell assembly of claim 7, wherein the refractive index of the spacer optical adhesive matches that of the transparent substrate, and that of the wedged spacer, within 0.005.

10. The liquid crystal cell assembly of claim 7, wherein the refractive index of the retarder optical adhesive matches that of the wedged spacer, and that of the optical retarder, within 0.01.

11. The liquid crystal cell assembly of claim 7, wherein the refractive index of the retarder optical adhesive matches that of the wedged spacer, and that of the optical retarder, within 0.005.

12. The liquid crystal cell assembly of claim 7, wherein the second planar face of the wedged spacer forms a wedge angle with a plane parallel to the first planar face of the wedged spacer, said wedge angle being sufficient to separate a beam that reflects from an interface of the transparent substrate and the second planar face as well as planar interfaces parallel to said interface from a beam that reflects from the first planar face as well as planar interfaces parallel to the first planar face.

13. The liquid crystal cell assembly of claim 7, wherein the second planar face of the wedged spacer forms an angle between about ¼ and about 8 degrees with a plane parallel to the first planar face of the wedged spacer.

14. The liquid crystal cell assembly of claim 7, wherein the second planar face of the wedged spacer forms an angle of about ½ degrees with a plane parallel to the first planar face of the wedged spacer.

15. A liquid crystal cell assembly for reducing interference in coherent light beams transmitted therethrough, comprising:
a transmissive liquid crystal cell comprised of:
a first substantially transparent flat, planar substrate having electrode materials on its inner surface,
a second substantially transparent flat, planar substrate having electrode materials on its inner surface, wherein each of said first and second transparent substrates has a substantially uniform thickness,
a joining adhesive for joining the two substrates to achieve a precisely controlled and parallel spacing between the two substrates, wherein the inner surfaces of the two substrates are facing each other, and
a cavity formed by the joining of the two substrates, defined by the inner surfaces, and filled with liquid crystal material;
a wedged spacer comprised of a substantially transparent optical material having substantially the same refractive index as the second transparent substrate, said wedged spacer having:
a first planar face, and
a second planar face, non-parallel to the first planar face; and
a substantially transparent optical adhesive joining the second transparent substrate of the liquid crystal cell to the second planar face of the wedged spacer.

16. The liquid crystal cell assembly of claim 15, wherein the refractive index of the optical adhesive matches that of the second transparent substrate, and that of the wedged spacer within 0.01.

17. The liquid crystal cell assembly of claim 15, wherein the refractive index of the optical adhesive matches that of the second transparent substrate, and that of the wedged spacer within 0.005.

18. The liquid crystal cell assembly of claim 15, wherein the first planar face of the wedged spacer is coated with a reflective coating.

19. The liquid crystal cell assembly of claim 15, further comprising:
a mirror joined to the first planar face of the wedged spacer.

20. The liquid crystal cell assembly of claim 15, further comprising:
a second wedged spacer joined to the first transparent substrate of the liquid crystal cell by a second substantially transparent optical adhesive, said wedged spacer having substantially the same refractive index as the first transparent substrate.

21. The liquid crystal cell assembly of 20, further comprising:
an optical retarder joined to the second wedged spacer using a substantially transparent retarder optical adhesive.

22. The liquid crystal cell assembly of claim 15, further comprising:
an optical retarder in optical series with the liquid crystal cell.

23. The liquid crystal cell assembly of claim 15, wherein the second planar face of the wedged spacer forms a wedge angle with a plane parallel to the first planar face of the wedged spacer, said wedge angle being sufficient to separate a beam that reflects from an interface of the transparent substrate and the second planar face as well as planar interfaces parallel to said interface from a beam that reflects from the first planar face as well as planar interfaces parallel to the first planar face.

24. The liquid crystal cell assembly of claim 15, wherein the second planar face of the wedged spacer forms an angle between about ¼ and about 8 degrees with a plane parallel to the first planar face of the wedged spacer.

25. The liquid crystal cell assembly of claim 15, wherein the second planar face of the wedged spacer forms an angle of about ½ degree with a plane parallel to the first planar face of the wedged spacer.

26. A liquid crystal cell assembly comprising:
a liquid crystal cell having a substantially transparent flat, planar substrate; and
a wedged spacer for reducing interference of coherent light beams as said coherent light beams pass through the liquid crystal cell assembly, said wedged spacer comprised of substantially transparent optical material having substantially the same refractive index as the transparent substrate, wherein the wedged spacer has two opposite and non-parallel planar faces, one of which is joined to the transparent substrate with a substantially transparent optical adhesive.

27. The liquid crystal cell assembly of claim 26, wherein the refractive index of the optical adhesive matches that of the transparent substrate, and that of the wedged spacer, within 0.01.

28. The liquid crystal cell assembly of claim 26, wherein the refractive index of the optical adhesive matches that of the transparent substrate, and that of the wedged spacer, within 0.005.

29. The liquid crystal cell assembly of claim 26, wherein the transparent substrate of the liquid crystal cell has electrode materials on its inner surface and the liquid crystal cell further comprises:
a substantially reflective flat, planar substrate having electrode materials on its inner surface, wherein each of said reflective substrate and said transparent substrate has a substantially uniform thickness;
a joining adhesive for joining the two substrates to achieve a parallel spacing between the two substrates, wherein the inner surfaces of the two substrates are facing each other; and
a cavity formed by the joining of the two substrates, defined by the inner surfaces, and filled with liquid crystal material.

30. The liquid crystal cell assembly of claim 26, wherein the transparent substrate of the liquid crystal cell has electrode materials on its inner surface and the liquid crystal cell further comprises:
a corresponding substantially transparent flat, planar substrate having electrode materials on its inner surface, wherein each of the transparent substrate and said corresponding transparent substrate has a substantially uniform thickness;
a joining adhesive for joining the two substrates to achieve a parallel spacing between the two substrates, wherein the inner surfaces of the two substrates are facing each other; and
a cavity formed by the joining of the two substrates, defined by the inner surfaces, and filled with liquid crystal material.

31. The liquid crystal cell assembly of claim 26, wherein the first planar face of the wedged spacer is coated with a reflective coating.

32. The liquid crystal cell assembly of claim 26, further comprising:
  a mirror joined to the first planar face of the wedged spacer.

33. A liquid crystal cell assembly comprising:
  a liquid crystal cell having a substantially transparent flat, planar substrate; and
  a wedge-shaped component for reducing interference of coherent light beams as said coherent light beams pass through the liquid crystal cell assembly, wherein the wedge-shaped component has two opposite and non-parallel planar faces, one of which is joined to the transparent substrate with a substantially transparent optical adhesive, and wherein said wedge-shaped component is comprised of a substantially transparent optical material having substantially the same refractive index as the transparent substrate.

34. The liquid crystal cell assembly of claim 33, wherein the wedge-shaped component is one of a wedged spacer and a wedged reflector.

35. A method of producing a plurality of liquid crystal cell assemblies which reduce interference in coherent light beams transmitted therethrough, comprising the steps of:
  fabricating a plurality of liquid crystal cells using panelized assembly, wherein each of the plural liquid crystal cells is comprised of a substantially transparent flat, planar substrate having electrode materials on its inner surface;
  fabricating a plurality of wedged spacers comprised of a substantially transparent optical material having substantially the same refractive index as the substantially transparent substrate, said wedged spacer having a first planar face and a second planar face non-parallel to the first planar face; and
  attaching each of the plural liquid crystal cells to a corresponding one of the plural wedged spacers by joining the substantially transparent substrate of each liquid crystal cell to the second planar face of each wedged spacer using a substantially transparent optical adhesive having substantially the same refractive index as the substantially transparent substrate of each liquid crystal cell and the substantially transparent optical material comprising each wedged spacer.

* * * * *